Nov. 2, 1954 J. MACEWKA Re. 23,892
FLUID ACTUATED PRESS
Original Filed March 7, 1951 2 Sheets-Sheet 1
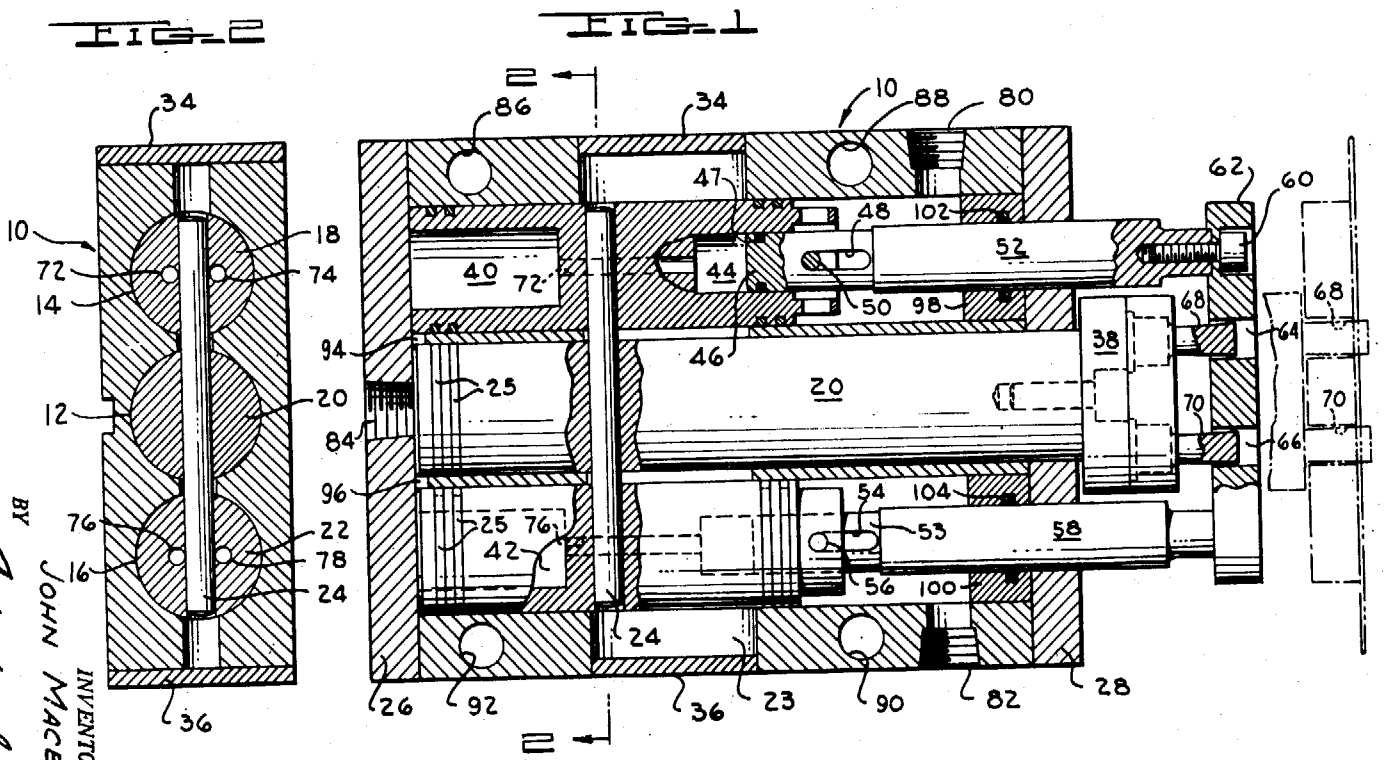
INVENTOR.
JOHN MACEWKA
BY
Arthur N. Smith
ATTORNEY

FLUID ACTUATED PRESS

Original Filed March 7, 1951 2 Sheets-Sheet 2

INVENTOR.
JOHN MACEWKA
BY
Arthur M. Smith
ATTORNEY

United States Patent Office

Re. 23,892
Reissued Nov. 2, 1954

23,892

FLUID ACTUATED PRESS

John Macewka, Detroit, Mich.

Original No. 2,642,138, dated June 16, 1953, Serial No. 214,398, March 7, 1951. Application for reissue June 3, 1954, Serial No. 434,354

7 Claims. (Cl. 164—95)

Matter enclosed in heavy brackets [ ] appears in the original patent but forms no part of this reissue specification; matter printed in italics indicates the additions made by reissue

The present invention relates to an hydraulically actuated press and more particularly to such a press including an assembly of hydraulic pistons adapted to actuate a press tool and the accompanying stripper plate in proper sequence. This application is related to my co-pending application, Serial No. 114,022, filed September 3, 1949, entitled "Hydraulic Cylinder."

It is well known that press constructions embody a pressure plate or other means for holding a workpiece in position for the press operation, and also a stripper plate which will separate the finished workpiece from the press tool after the press operation is completed. The stripper plate and pressure plate are often combined into one element known as the "stripper clamp." The stripper clamp is placed upon the workpiece under pressure to hold the workpiece in position, the press operation is performed, and the stripper clamp is maintained on the workpiece to hold it in position while the press tool is removed from the workpiece.

Conventional press constructions using this stripper clamp have generally utilized a complicated system of hydraulic circuits to effect the necessary operations, such systems embracing an excessively large space. Factory space is extremely valuable and plant layout engineers are ever attempting to utilize every bit of area to its best advantage. Thus, an efficient hydraulic press construction has been sought which is simple, easy to maintain, and compact.

Another disadvantage of conventional construction has been the necessity of providing a large number of heavy, closely machined ways or guides on the stripper clamps so that such guides will accurately seat the stripper clamps, and withstand the pressures to which they are subjected. Therefore, stripper clamp constructions which are efficient, and which have an accurate, simple, and sturdy guiding means have long been desired.

It is, accordingly, a primary object of the present invention to provide a simple and efficient hydraulic press construction embodying a stripper clamp and a press mechanism cooperating therewith, which are actuated in proper sequence by a simple and compact hydraulic unit.

It is a further object of the present invention to provide a press construction embodying a stripper clamp which has simple and efficient supporting and guiding means.

It is a further object of the present invention to provide an hydraulic press employing a plurality of hydraulic cylinders so disposed and arranged with respect to the press tool and stripper clamp that the stripper clamp and press tool will move relative to each other to provide the necessary holding, working, and stripping operations.

It is another object of the present invention to provide an hydraulic press including a main piston rigidly and transversely connected with a plurality of supplemental pistons, said main piston being connected to the press tool at its free end, and each supplemental piston having a secondary piston in limited sliding engagement therewith, said secondary pistons being rigidly affixed to a stripper clamp to effect relative movement between the press tool and the stripper clamp.

Other objects of this invention will appear in the following description and appended claims, reference being had to the accompanying drawings forming a part of this specification wherein like reference characters designate corresponding parts in the several views.

In the drawings:

Fig. 1 is a midsection of an hydraulic press embodying one modification of the present invention, with portions of the pistons and stripper clamp being broken away for clarity.

Fig. 2 is a sectional view taken along the line 2—2 in the direction of the arrows Fig. 1.

Figure 3:
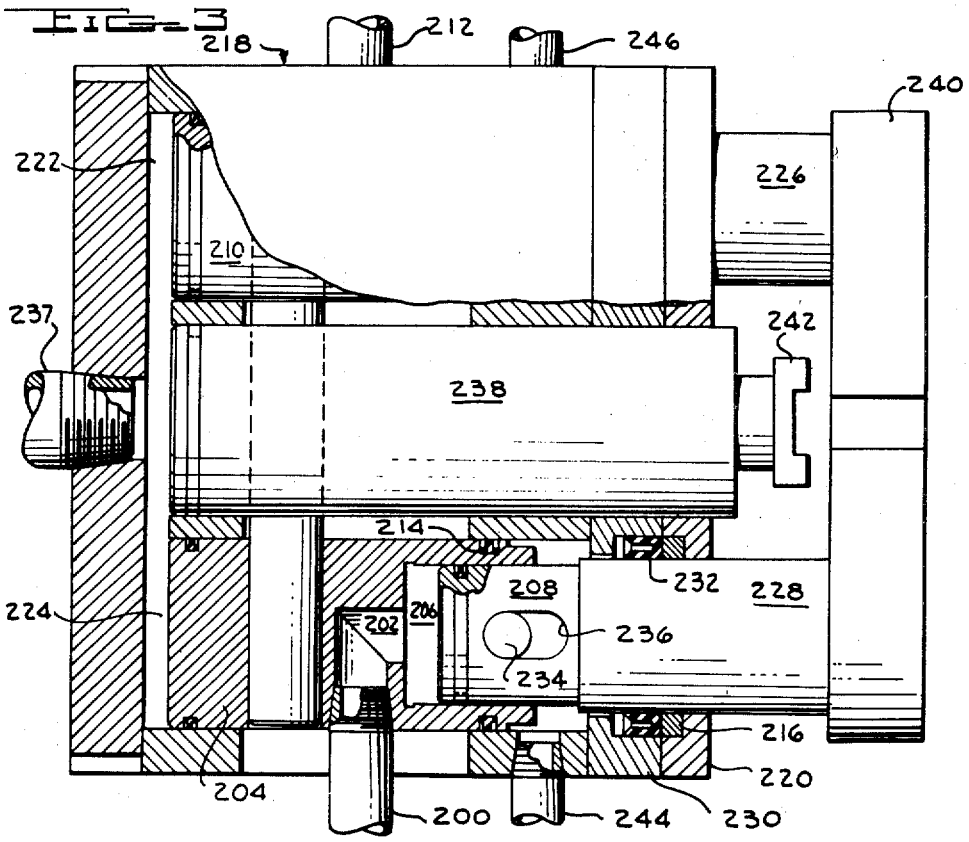
Fig. 3 is a side view of an hydraulic press embodying another modification of the present invention, with portions broken away to disclose the internal construction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the modification of the present invention shown in Figs. 1 and 2 of the drawings, an hydraulic press is shown comprising the housing 10 having the cylinders 12, 14, and 16 formed therein. The main piston 20, and the supplemental pistons 18 and 22 are disposed in the cylinders 12, 14, and 16 respectively. An elongated slot 23 is formed in the housing 10 and connects the cylinders 12, 14, and 16. A dowel member 24 is disposed in the slot 23 and rigidly connects the pistons 18, 20 and 22. Suitable piston rings or seals 25 are provided on each of the pistons 18, 20, and 22 to prevent the hydraulic fluid from leaking around the piston walls.

The ends of the housing 10 are closed by the end plates 26 and 28. The slot 23, which extends through the outer side walls of the housing 10, is closed by the side plates 34 and 36 respectively.

The main piston 20 has the press tool 38, in this instance a punch, affixed to its free end. The tops of the supplemental pistons 18 and 22 are provided with the hollow interiors 40 and 42. The interiors of these two piston constructions are identical and the remarks in connection with the supplemental piston 18 will also apply to the supplemental piston 22. The foot of the supplemental piston 18 is provided with the secondary cylinder portion 44 having disposed therein a secondary piston 46. A suitable piston ring or seal is indicated at 47. The secondary piston 46 is provided along its side with the elongated slot 48. Disposed within this slot 48 is the pin 50 which is rigidly affixed to the supplemental piston 18. The free end of the secondary piston 46 comprises the guide rod 52. The corresponding parts in the supplemental piston 22 are the secondary piston 53, the slot 54, the pin 56, and the guide rod 58. The guide rods 52 and 58 are connected by any suitable means such as the bolt 60 to the stripper clamp 62. The stripper clamp 62 in this instance is provided with the holes 64 and 66 to accommodate the punches 68 and 70 on the press tool 38. Conduits 72 and 74 are provided in the body of the supplemental piston 18 and connect that chamber 40 with the cylinder 44. Similar conduits 76 and 78 are provided in the body of the supplemental piston 22.

Ports 80, 82, and 84 are provided in the housing 10 to adapt the housing 10 for connection with an hydraulic circuit. These ports are screw-threaded to facilitate connection with the screw-threaded connecting caps which are provided on hydraulic hoses. Mounting holes 86, 88, 90 and 92 are provided in the housing 10 to adapt the housing for mounting on a press frame. Passages 94 and 96 are provided at the left end of the housing 10 (Fig. 1) to connect the cylinders 12, 14, and 16. Suitable bearings 98 and 100 are disposed at one end of the housing 10 adjacent the end plate 28. These bearings guide and support the rods 52 and 58. Seals 102 and 104 are provided in the bearings 98 and 100 to prevent leakage of hydraulic fluid through the end plate 28.

OPERATION

The operation of the modification shown in Figs. 1 and 2 of the drawings is as follows:

Hydraulic fluid is introduced through the port 84 against the top of the piston 20 and passes through passages 94 and 96 into the cylinders 14 and 16. The hydraulic fluid passes into the chamber 40 in the supplemental piston 18 through the conduits 72 and 74, into the secondary cylinder chamber 44 and against the top of the secondary piston 46. The same action takes place in connection with the supplemental piston 22. The secondary pistons 46 and 53 are forced to the right relative to the pins 50 and 56 and thus, the stripper clamp 62 precedes the press tool 38 in operative travel. The workpiece is first engaged by the stripper clamp 62 and then the press tool 38 follows through to perform the punching operation, the pins 50 and 56 moving within the slots 48 and 54, respectively. When the operation is completed, the hydraulic fluid is introduced through the ports 80 and 82 into the bottom of the cylinders 18 and 22. At this point, the pins 50 and 56 are near the right end of the slots 48 and 54. As fluid is introduced through the ports 80 and 82 the pressure within the bottom of supplemental cylinders 14 and 16 is increased to a point where it is greater than the pressure being exerted within the chambers 40 and 42 in the heads of the supplemental pistons 18 and 22. Thus, the supplemental pistons 18 and 22 are moved leftward against the fluid pressure in the top of the supplemental cylinders 14 and 16 and in the chambers 40 and 42. As the supplemental pistons 18 and 22 move leftward, fluid from the chambers 40 and 42 moves through the conduits 72 and 74 and maintains the pressure on the heads of the secondary pistons 52 and 58, thereby holding the stripper clamp 62 in position on the workpiece. The supplemental pistons 18 and 22 thus move leftward until the pins 50 and 56 contact the left walls of the slots 48 and 54, thus moving the press tool 38 away from the workpiece while the stripper clamp 62 is held thereon, and pulling the punches 68 and 70 through the openings 64 and 66 in the stripper clamp 62. Thus, the supplemental pistons 18 and 22 and the press tool 38 are moved leftward a distance approximately the length of one of the slots 48 or 54 before the said supplemental pistons start to effect the leftward movement of the rods 52 and 58 and the stripper clamp 62 connected thereto. When the punches 68 and 70 have cleared the workpiece, the pins 50 and 56 have reached their leftward limit of travel in the slots 48 and 54, respectively, and the guide rods 52 and 58 with the stripper plate 62 affixed thereto are carried leftward. Thus, the cycle is completed with a simple hydraulic unit and with a simple and compact mechanism.

Figure 4:
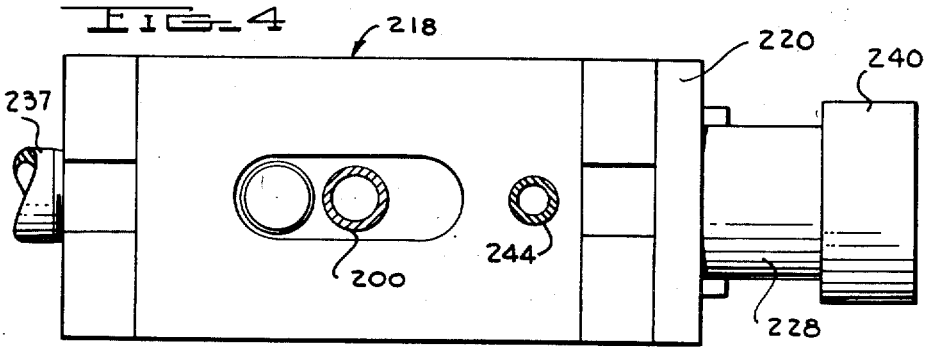
Fig. 4 is an end view of the embodiment shown in Fig. 3.

A modification of the device shown in Figs. 1 and 2 is demonstrated in Figs. 3 and 4 of the drawings. The important difference in this construction is the provision of the separate hydraulic feed line 200. This line is connected with the passage 202 in the lower piston 204 which communicates with the cylinder chamber 206 and in which chamber the secondary piston 208 is disposed. Thus, it will be seen that the passage 202 in this modification is substituted for, and performs the same function as, the passages 72, 74, 76 and 78, shown in Fig. 2 of the drawings. The operation of this modification is similar to that shown in Figs. 1 and 2 of the drawings. The pistons 204 and 210 are of identical construction and the supplemental piston 210 utilizes the hydraulic feed line 212.

Suitable seals, such as the neoprene "T" seals 214 are provided on the various pistons to prevent leakage of the hydraulic fluid. In addition, a bearing 216 is provided at one end of the housing 218 adjacent the end plate 220 in each of the cylinders 222 and 224 to guide and support the rods 226 and 228. A retaining ring 230 is disposed around the rod 228 and contains suitable sealing means such as the neoprene "U" seal 232. A similar construction is positioned around the rod 226.

OPERATION

In discussing the operation of the modification shown in Figs. 3 and 4 of the drawings, the operation of only one of the supplemental pistons, the supplemental piston 204 will be described. However, it is to be understood that the supplemental piston 210 and its accompanying construction operate in an identical manner.

In operation, hydraulic fluid is introduced through the feed line 200 which moves the secondary piston 208 to the right relative to the supplemental piston 204. In the meantime, hydraulic fluid is introduced through the inlet port 237 which fluid has started the rightward travel of the connected pistons 204, 210 and 238. The stripper clamp 240 reaches the workpiece first and holds it in place while the press tool 242 follows through with its operation. Upon the return stroke, hydraulic fluid is introduced through the return hose 244 until the fluid pressure at the bottom of the supplemental cylinder 224 is greater than the fluid pressure at the top thereof. This fluid pressure causes the supplemental piston to move leftward against the fluid pressure exerted upon the top of the piston. Since there is no component of the fluid pressure acting to the left on the secondary piston, the secondary piston will remain in position under pressure until the pin 234, which is affixed to the supplemental piston 204, contacts the left wall of the slot 236. The press tool 242 is moved leftward while the stripper clamp 240 remains in position. The stripper clamp, thus, holds the workpiece in place so that the press tool 242 may be removed without displacing and distorting the workpiece. As the pin 234 hits the left wall of the slot 236, the press tool 242 has been removed from contact with the workpiece and the secondary piston 208 is then carried leftward by the pin 234 which is rigidly affixed to the supplemental piston 204. Thus, the stripper clamp 240 is moved away from the workpiece and the workpiece may be removed. The return line for the supplemental piston 210 is designated at 246.

It will be understood, of course, that upon the return stroke, the hydraulic fluid in the cylinder 224 and the secondary cylinder 206 is dispelled through the lines 237 and 200, respectively, so that these lines, which were originally feed lines, now become drain lines.

Each of the modifications illustrated herein embody the novel features of the present invention to provide a simple and efficient press construction utilizing a combination stripper and pressure plate in the form of a stripper clamp, a simple and compact hydraulic circuit, sturdy guide and support means for the stripper clamp, and a secondary piston assembly which effects relative movement between the press tool and the stripper clamp.

Having thus described my invention, I claim:

1. *A fluid* [An hydraulically] actuated press comprising a housing having a plurality of parallel cylinder bores therein and also having an elongated slot therein extending in the direction of the axes of said bores, said slot interconnecting said bores, a main piston disposed in one of said bores and adapted for connection with a press tool, a supplemental piston disposed in another of said bores and adapted for connection to a stripper clamp, a dowel member extending through said slot in said housing and rigidly connecting said main piston and said supplemental piston, a secondary piston disposed within the foot of said supplemental piston in limited sliding engagement therewith so that said secondary piston may move a limited distance relative to said supplemental piston, means for [hydraulically] actuating said secondary piston *with a fluid*, means for thereafter [hydraulically] actuating said main and supplemental pistons *with a fluid*, and return means for returning secondly said secondary piston and first said main piston and supplemental pistons to their initial positions.

2. *A fluid* [An hydraulically] actuated press adapted to hold a workpiece in position, perform a work operation thereon with a press tool, and strip said workpiece from said press tool, including a housing with a main cylinder and supplemental cylinders parallel to said main cylinder formed therein, a main piston disposed in said main cylinder, a press tool connected to the free end of said main piston, a plurality of supplemental pistons disposed one in each of said supplemental cylinders and rigidly connected to said main piston so that main piston and supplemental pistons will move together, each of said supplemental pistons having a secondary cylinder formed therein, a plurality of secondary pistons disposed one in limited sliding engagement with each of said supplemental pistons in the secondary cylinder formed therein, a stripper clamp attached to the free ends of said secondary pistons, and *a fluid supply* [an hydraulic] system including means to feed said main, supplemental, and secondary cylinders so that said secondary pistons will move relative to said supplemental pistons to effect the necessary holding and stripping operations.

3. [An hydraulically] *A fluid* actuated press comprising a housing having a plurality of parallel cylinder bores therein and also having an elongated slot therein extending in the direction of the axes of said bores, said slot interconnecting said bores, a main piston disposed in one of said cylinder bores and adapted for connection with a press tool, a plurality of supplemental pistons disposed one in each of the other of said bores, each of said supplemental pistons having an open chamber formed in the head thereof and a secondary open cylinder formed at the foot thereof which are connected by a passage, a dowel member extending through said housing slot and rigidly connecting said main and supplemental pistons together, a plurality of secondary pistons disposed one in each of the secondary cylinders in said supplemental pistons and having an elongated slot therethrough extending in the direction of its axis, a pin rigidly affixed to said supplemental piston and extending through said slot, a connecting rod extending from the free end of said secondary piston and adapted for connection to a stripper clamp, inlet means communicating with the head of said main and supplemental cylinders and adapted to first actuate said secondary pistons through the passages in said supplemental pistons until the side wall of the slot in said secondary piston contacts the pin and moves the supplemental piston, and then moves said main and supplemental pistons, return means communicating with the other end of each of said supplemental cylinders and adapted to move said supplemental pistons in the return stroke until the pins affixed thereto contact the side walls of the slots in said secondary pistons at which time the secondary pistons also move, and a source of [hydraulic] fluid connected with said inlet and return means.

4. [An hydraulically] *A fluid* actuated press comprising a housing having a plurality of parallel cylinder bores therein and also having an elongated slot therein extending in the direction of the axes of said bores, said slot interconnecting said bores and extending through at least one external side wall of said housing, a main piston disposed in one of said cylinder bores and adapted for connection to a press tool, a plurality of supplemental pistons disposed one in each of the other of said bores, a dowel member extending through said housing slot and rigidly connecting said main piston and said supplemental pistons together, a secondary open cylinder formed at the foot of each of said supplemental pistons, a secondary piston disposed in each of the secondary cylinders in said supplemental pistons and having an elongated slot therethrough extending in the direction of its axis, a pin rigidly affixed to said supplemental piston and extending through said slot, a connecting rod extending from the free end of said secondary piston and adapted for connection to a stripper clamp, a passage extending from the side of at least one of said supplemental pistons and communicating with the secondary cylinder formed therein, inlet means connected to the opening of the passage in the side of said supplemental piston and extending through the slot in the external side wall of said housing, inlet means communicating with the head of the main and supplemental cylinders, and return means communicating with the foot of at least one of said supplemental cylinders, all of said inlet means and return means being adapted for connection to a source of [hydraulic] fluid under pressure.

5. *A fluid* [An hydraulically] actuated press adapted to hold a workpiece, perform a work operation thereon with a press tool, and strip said workpiece from said press tool comprising a housing having a plurality of cylinder bores therein, a main piston disposed in one of said cylinder bores, a press tool affixed to the free end of said main piston, a supplemental piston disposed in another of said cylinder bores and having a secondary cylinder formed therein, said main piston and supplemental piston being directly connected to move together, a secondary piston disposed in limited sliding engagement with said supplemental piston in the secondary cylinder formed therein, a stripper clamp affixed to the free end of said secondary piston, and [hydraulic] means for feeding *fluid to* said main, supplemental and secondary cylinders so that said secondary pistons will move relative to said supplemental pistons to effect the necessary holding and stripping operations.

6. *A fluid* [An hydraulically] actuated press comprising a housing having a plurality of cylinder bores therein, a main piston disposed in one of said cylinder bores and adapted for connection with a press tool, a supplemental piston disposed in another of said bores and rigidly affixed to said main piston for movement therewith, said supplemental piston having an open chamber formed in the head thereof and a secondary cylinder formed at the foot thereof which are connected by a passage, a secondary piston disposed in said secondary cylinder and having an elongated slot therethrough extending in the direction of its axis, a pin rigidly affixed to said supplemental piston and extending through said slot, a connecting rod extending from the free end of said secondary piston and adapted for connection to a stripper clamp, inlet means communicating with the head of said main and supplemental cylinders and adapted to first actuate said secondary piston through the passage in said supplemental piston until the side wall of the slot in said secondary piston contacts the pin and moves the supplemental piston, and then moves said main and supplemental pistons, return means communicating with the other end of said supplemental cylinder and adapted to move said supplemental piston in the return stroke until the pin affixed thereto contacts the side wall of the slot in said secondary piston at which time the secondary piston also moves, and a source of [hydraulic] fluid connected with said inlet and return means.

7. *A fluid* [An hydraulically] actuated press comprising a housing having a plurality of parallel cylinder bores therein and also having an elongated slot extending through an external side wall thereof in the direction of the axes of said bores, a main piston disposed in one of said cylinder bores and adapted for connection to a press tool, a supplemental piston disposed in another of said bores and rigidly affixed to said main piston for movement therewith, said supplemental piston having a secondary cylinder formed at the foot thereof, a secondary piston disposed in said secondary cylinder and having an elongated slot therethrough extending in the direction of its axis, a pin rigidly affixed to said supplemental piston and extending through said slot, a connecting rod extending from the free end of said secondary piston and adapted for connection to a stripper clamp, a passage extending from the side of said supplemental piston and communicating with the secondary cylinder formed therein, inlet means connected to the opening of the passage in the side of said supplemental piston and extending through the slot in the external side wall of said housing, inlet means communicating with the head of the main and supplemental cylinders, and return means communicating with the foot of said supplemental cylinder, all of said inlet means and return means being adapted for connection to a source of [hydraulic] fluid under pressure.

References Cited in the file of this patent or the original patent

UNITED STATES PATENTS

| Number | Name | Date |
|---|---|---|
| 2,118,648 | Johnson | May 24, 1938 |